United States Patent [19]

Perecman

[11] Patent Number: 4,650,537

[45] Date of Patent: Mar. 17, 1987

[54] TAPE APPLICATOR

[75] Inventor: Jack L. Perecman, Golden Valley, Minn.

[73] Assignee: Minnesota Mining and Manufacturing Company, St. Paul, Minn.

[21] Appl. No.: 741,817

[22] Filed: Jun. 6, 1985

[51] Int. Cl.⁴ .............................................. B32B 31/00
[52] U.S. Cl. .................................... 156/518; 156/265; 156/519; 156/520
[58] Field of Search ................................ 156/518–521, 156/264, 265, 522

[56] References Cited

U.S. PATENT DOCUMENTS

| | | | |
|---|---|---|---|
| 2,760,414 | 8/1956 | Cornock et al. | 156/521 X |
| 3,074,467 | 1/1963 | Takats | 156/522 X |
| 3,960,641 | 6/1976 | Pedersen | 156/519 X |
| 3,963,557 | 6/1976 | Patterson | 156/519 |
| 4,001,072 | 1/1977 | deNeui | 156/461 |
| 4,189,339 | 2/1980 | Loeffler | 156/519 X |
| 4,284,454 | 8/1981 | Joa | 156/519 X |

*Primary Examiner*—David Simmons
*Attorney, Agent, or Firm*—Donald M. Sell; James A. Smith; John C. Barnes

[57] ABSTRACT

A tape applicator for use in applying lengths of tape transversely at spaced parallel positions to a continuously moving receptor web. The applicator applies the lengths of tape to the moving web from a polygonal vacuum head which is moved into contact with the web at web speed to transfer the tape to the web. The vacuum applicator is rotatable about an axis and supports the length of tape prior to transfer on a surface disposed transversely to the direction of movement of the web.

5 Claims, 5 Drawing Figures

TAPE APPLICATOR

BACKGROUND OF THE INVENTION

1. Field of the Invention

This invention relates to an improved tape applicator for applying a length of tape transversely to the direction of movement of a web with lengths of tape disposed in parallel relationship at spaced positions along the length of the web. In one aspect, this invention relates to an apparatus for cutting and applying long lengths of tape to a continuously moving web transverse to the direction of movement.

2. Description of the Prior Art

Sections of tape have been applied to moving webs in the past, and the applicators for applying sections of tape are illustrated in patents such as U.S. Pat. No. 3,963,557, issued June 15, 1976, and U.S. Pat. No. 4,001,072, issued Jan. 4, 1977. In each of these patented devices a length of tape has been applied to a continuously moving web at spaced intervals along the length of the web. In each instance however the transverse dimension of the tape with respect to the direction of movement of the web has not exceeded the width of the tape supplied from the supply to the applicator.

There have been other instances where it is desirable that a length of tape exceeding the width of the tape in the supply roll should be applied to the web. This however has not been accomplished mechanically where the web is continuously moving and the length of tape is applied without changing the processing speed of the web to other stations or areas of web treatment or processing.

It is thus an object of the present invention to provide means for applying a length of tape transversely of a continuously moving web where the "length of tape" means that the dimension of the tape in a direction transverse to the direction of movement of the web exceeds the width of the tape as provided in a supply roll of tape.

SUMMARY OF THE INVENTION

The present invention provides a tape applicator for use in applying a length of tape transverse to the direction of continuous movement of a receptor web. The tape applicator comprises means for supporting a supply roll of tape. Tape is advanced from the supply roll and is moved in a direction toward the applicator which is parallel to the direction of movement of the web. Lengths of tape are then moved in a direction transverse to the direction of movement of the web and placed on a supporting surface. Means are provided in the machine for moving the support surface for the lengths of tape in a direction toward the web and in the direction of movement of the web to afford a transfer of the tape from the support surface to the web. The speed of movement of the support member and the length of tape at the tangent to the arc of movement will match the linear speed of the web when the tape is brought into contact with the web.

The strip of tape is placed on the support with the adhesive coated surface of the tape being positioned toward the receptor web such that the tape will be transferred to the web from the support surface as the adhesion afforded by the adhesive coated face of the tape exceeds the forces tending to retain the length of tape on the support.

The support comprises a polygonal support member having means supporting the same for rotation about an axis perpendicular to the sides of the support member. Means are afforded for applying subatmospheric pressure to small openings in the sides of the support member. Tape guide members are positioned adjacent the polygonal member for placing tape in contact with the sides of said member. Means are provided for rotating said support member about its axis to advance tape from the tape guide members in directions transverse to the direction of movement of the receptor web. Cutting means are positioned adjacent the support member for cutting lengths of tape applied to the sides of said support member.

Pairs of parallel arms support a frame upon which the support member is rotatably mounted to rotate said support member from a position spaced from the path of the receptor web to a position contacting said receptor web and moving in a direction corresponding to that of the receptor web. The rotating movement of the frame provides intervals of time for rotation of the support member about its axis to advance additional lengths of tape on the sides of the support member for application to the continuously moving web.

Drive means are provided for rotating the frame member and for rotating the support member about a fixed axis transverse to the direction of movement of the web to place the support member into contact with the web.

BRIEF DESCRIPTION OF THE DRAWING

The present invention will be hereinafter described with references to an accompanying drawing wherein.

DETAILED DESCRIPTION OF THE PRESENT INVENTION

Figure 1:
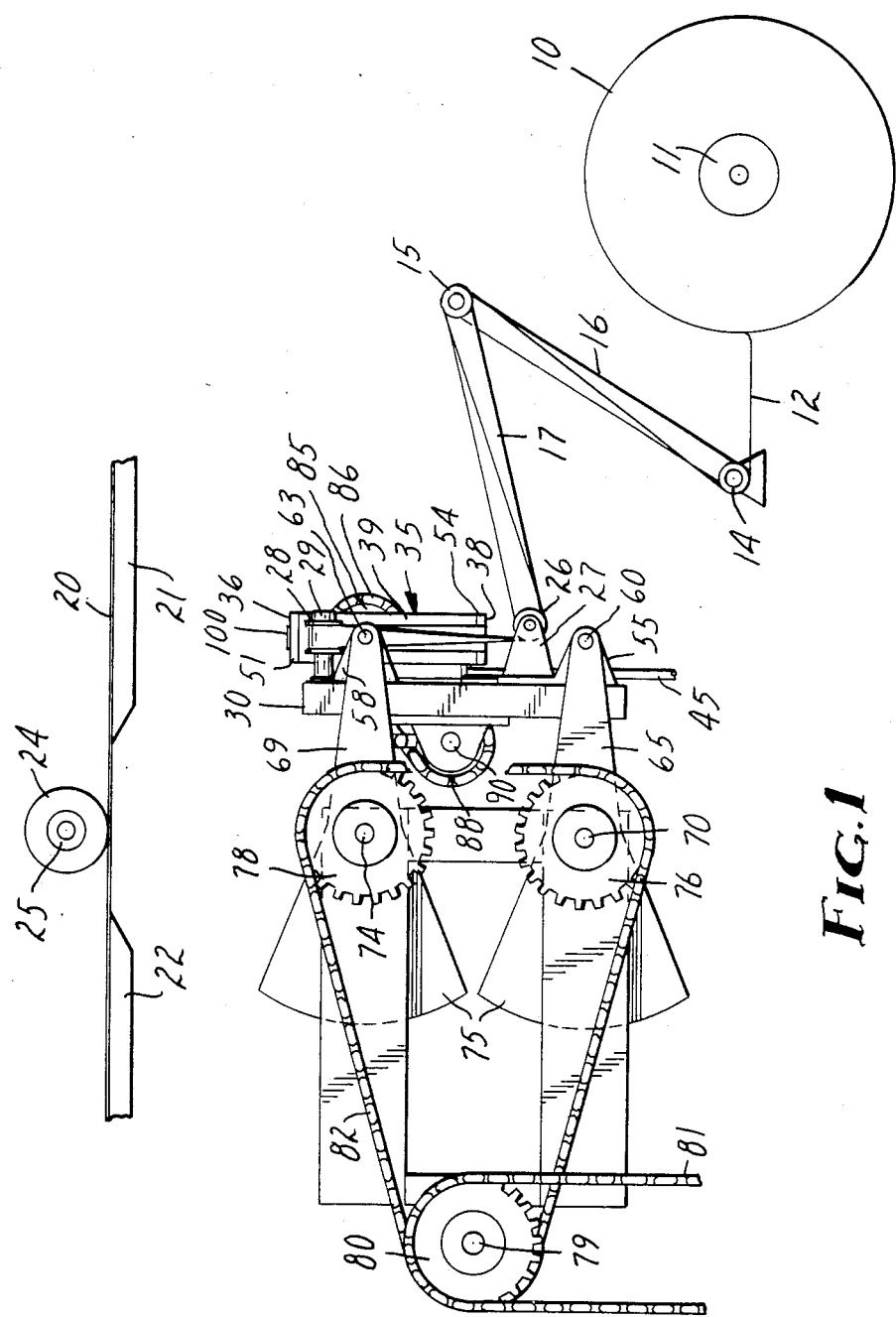
FIG. 1 is a fragmentary side elevational view illustrating the applicator of the present invention and receptor web.

The following description refers to the drawing and like reference numerals will refer to like parts throughout the several views. The applicator of the present invention is constructed to apply a length of tape which exceeds the width dimension of the tape transverse to the direction of a continuously moving web. The tape is supplied in a roll 10 which is mounted upon a spindle 11 and freely rotatable. The tape 12 is normally a tacky pressure-sensitive adhesive coated tape wound in the roll 10 with the adhesive coated surface of the tape wound inwardly.

The tape 12 is drawn from the roll 10 and passes around a roller 14 on a fixed axis and a second roller 15, supported on a pivoted link 16. The tape then passes around a roller 26. A link 17 connects the axis of the roller 15 to the axis of roller 26 to be described hereinafter. The rollers 14, 15, 26 and the links 16 and 17 permit the tape to be withdrawn from the roll 10 at varying speeds without placing varying amounts of tension in the tape 12.

The tape is drawn from the roll 10 in a direction generally parallel to the direction of movement of a receptor web 20. The receptor web 20 is guided along a path defined by support members 21 and 22 beneath a backup roll 24 mounted rotatably on an axis 25 positioned transversely of the direction of movement of the web 20.

The tape 12, as it is moved in the direction of the movement of the web 20, passes around roller 26 supported on a frame 30 of generally rectangular configuration. The roller 26 is mounted for rotation about an axis on a bracket 27 supported on the frame 30. The tape then moves from the roller 26 to a roller 28 which is rotatably mounted on a shaft 29 which is positioned perpendicular to the axis of the roller 26 and has its periphery positioned in a plane passing generally through the center of the roller 26 to receive the tape from roller 26 and guide the same in a direction opposite the direction of movement of the web 20. The tape 12 goes around the roller 28 toward a rotatable tape support and transfer member, hereinafter referred to as the tape support 35. The tape support 35 is a polygonal plate, illustrated as rectangular, having sides 36, 37, 38, and 39 of a length corresponding to the greatest length of tape to be applied to the web 20. The transverse dimension of the sides 36-39 exceed the width of the tape, and the sides are provided with small openings 40 communicating with small bores 41 (see FIG. 3) formed in the tape support 35 which bores communicate with a manifold 42. A slight vacuum or below atmospheric pressure is applied from a pump through hose 45 to the manifold 42 which decreases the pressure in the passages 41 to a pressure less than atmospheric.

The tape support 35 is mounted for rotation about an axis 47 symmetrical with said support. The axis 47 is the center of a support hub 48 which is mounted on the plate 30 and is connected to the vacuum line 45 and formed to rotatably support the tape support 35 and transfer the vacuum pressure to the manifold 42.

Figure 2:
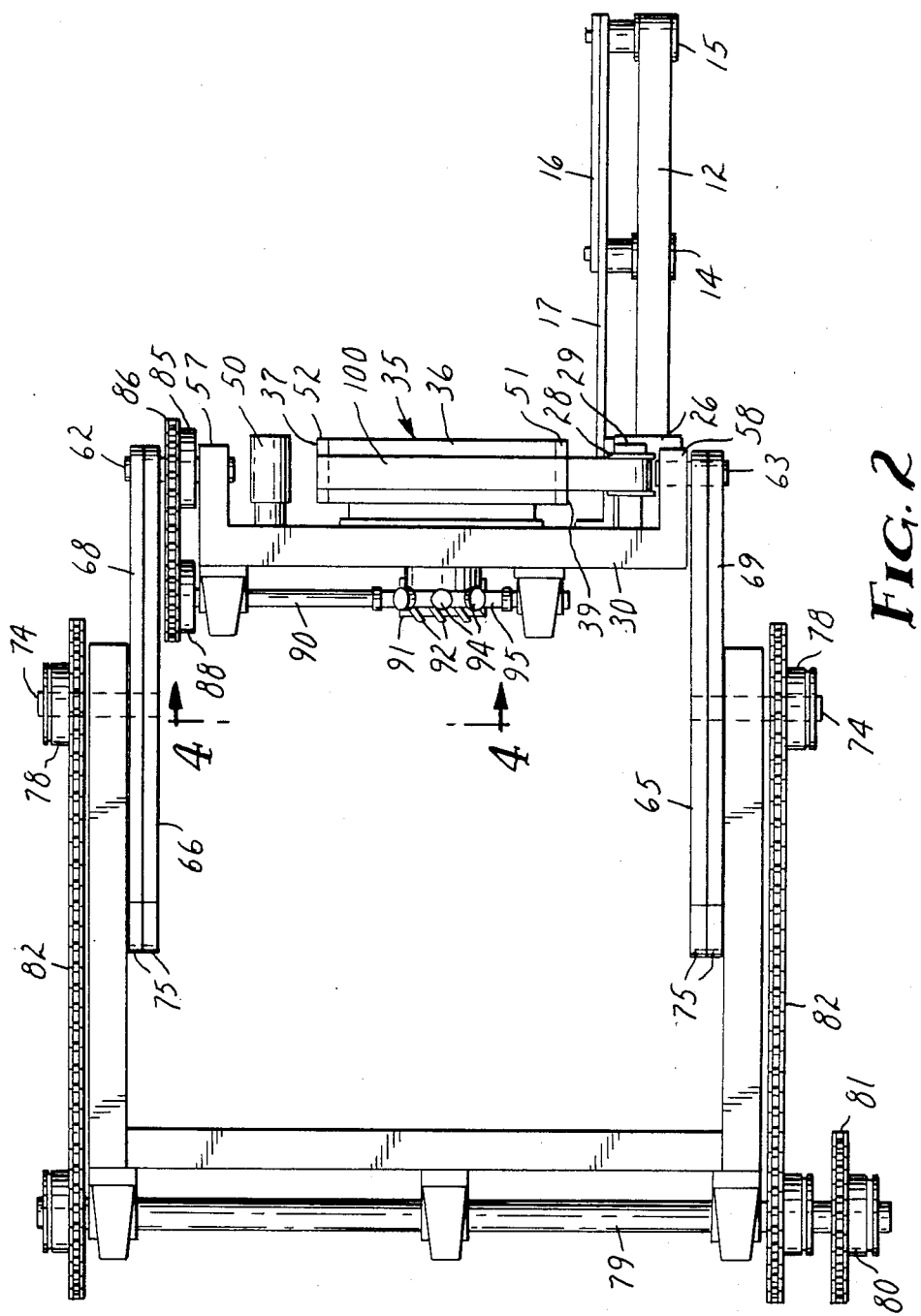
FIG. 2 is a top plan view of the applicator of FIG. 1.
Figures 3, 4:
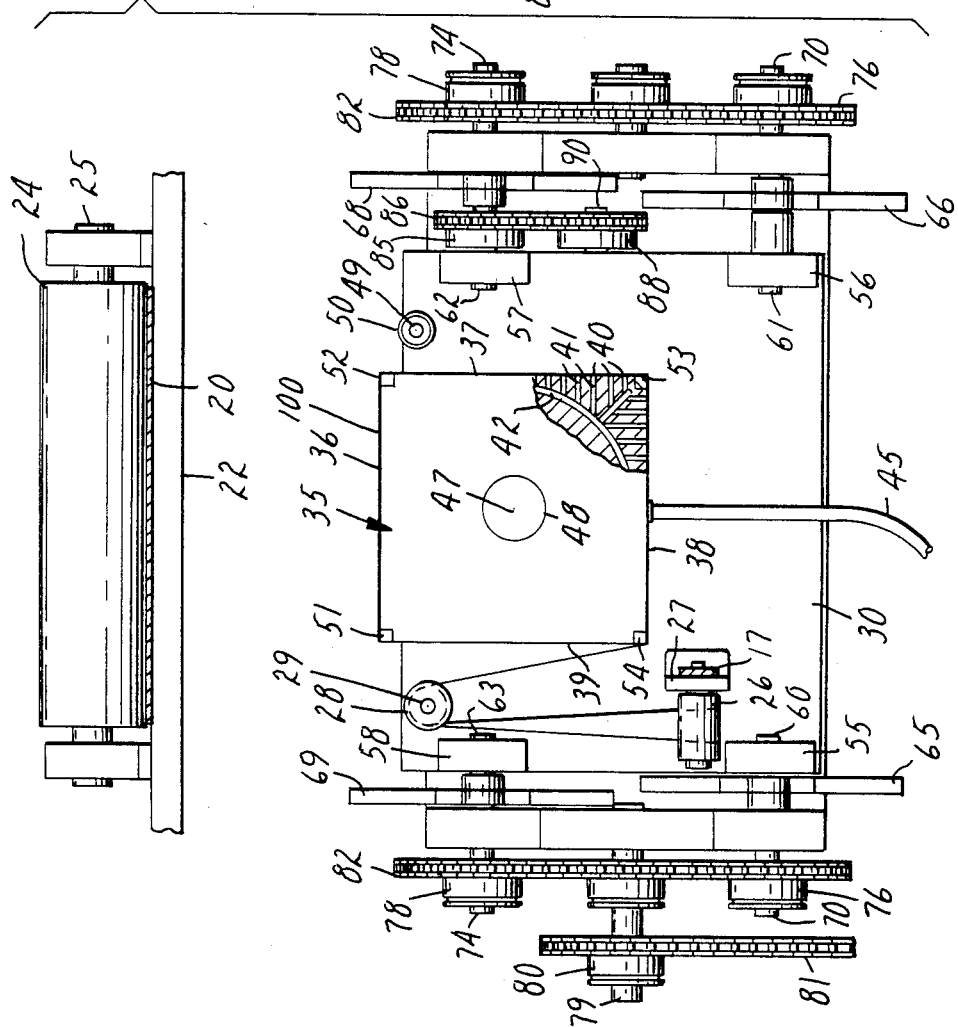
FIG. 3 is a front elevational view of the applicator of FIG. 1 and the receptor web.
FIG. 4 is a fragmentary vertical sectional view of the applicator taken along the line 4—4 of FIG. 2.

A cutting member 50 in the form of a hardened roller rotatably supported on an axis 49 is positioned on frame 30 to engage hardened anvils 51, 52, 53, and 54 positioned at the corners of the tape support 35. Upon rotation of the tape support 35 about the axis 47 the tape, which is supported on the sides of the tape support, is severed against the corners defined by the anvils and separated into lengths which correspond to the lengths of the sides of the tape support. Thus, upon each 90 degrees of rotation of the tape support 35, a length of tape which is applied to the side members is severed from the length of tape positioned on an adjacent side member. As an illustration, as seen in FIGS. 2 and 3, the length of tape 100 on the support side 36 has been severed as the anvil 52 passed the hardened roller 50 to sever that length of tape from the length of tape supported on the side 37 of the tape support member 35.

Figure 5:
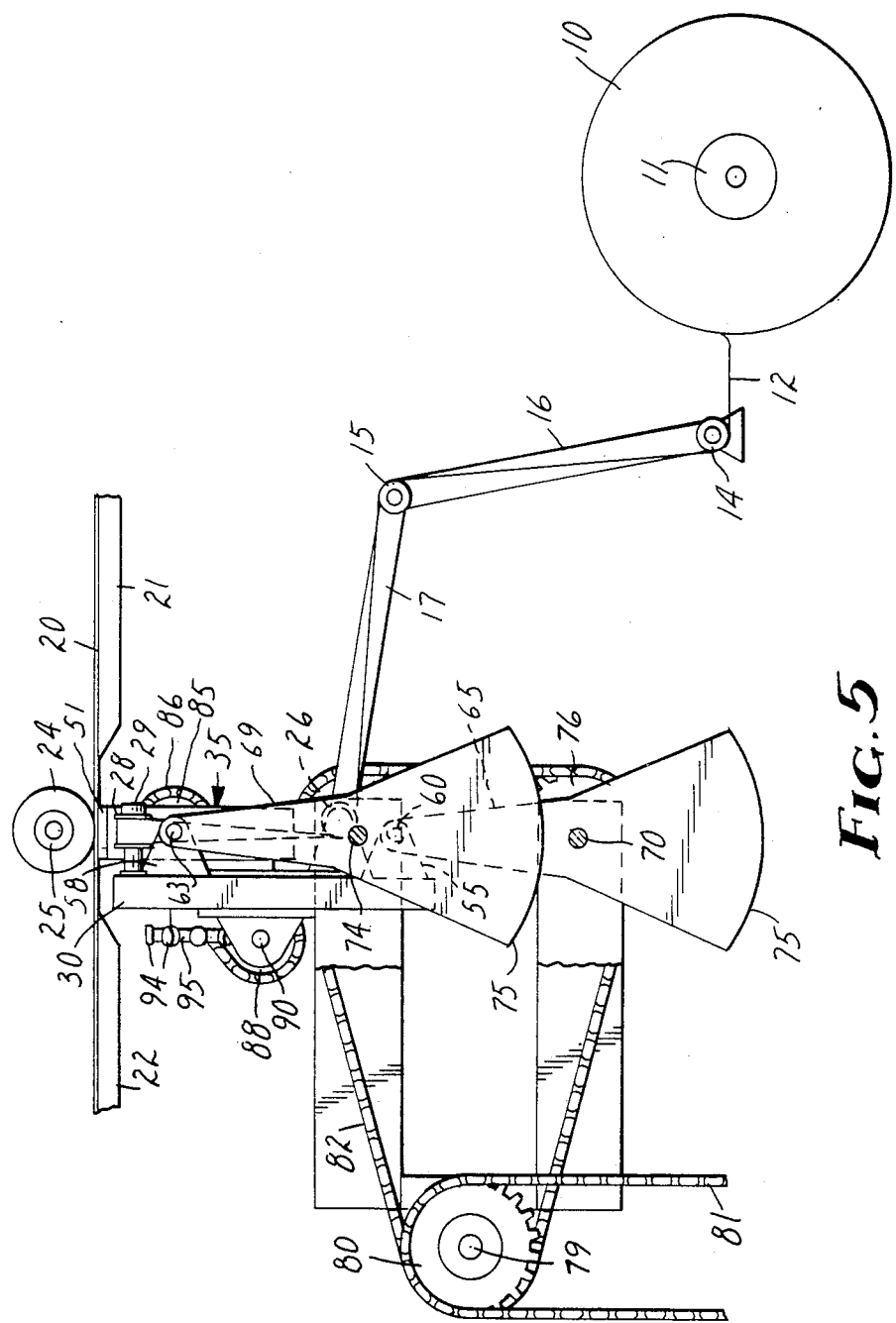
FIG. 5 is a fragmentary side elevational view of the applicator of FIG. 1 showing the same in position to apply a length of tape to the receptor web.

The plate 30 is provided with four ears 55, 56, 57, and 58. These ears journal stub shafts 60, 61, 62, and 63, which are rotatable with respect to the ears and support the plate for movement about an arcuate path to carry the tape support 35 from a position shown in FIG. 1 to the position shown in FIG. 5. The support 35 then continues to move counterclockwise back to the position of FIG. 1.

Connected to the stub shafts 60 and 61 are a first pair of parallel arms 65 and 66. Connected to the shafts 62 and 63 are a second pair of parallel arms 68 and 69, respectively. The arms 65 and 69 and the arms 66 and 68 form a parallelogram linkage for moving the frame 30 in a circular path maintaining the frame 30 at all times in a generally vertical position. The arms 65 and 66 are also supported for rotation on axis 70, and the arms 68 and 69 are also supported for rotation about an axis 74. The arms 65, 66, 68 and 69 are all of identical shape and extend past the axis 70 and 74 to provide for counterweight portions of the arms to balance the rotation of the plate 30. These weighted portions of the arms are clearly illustrated in FIG. 1 and are designated 75 for each of the arms. The arms 65, 66, 68 and 69 afford translational rotation to the tape support 35 as the frame 30 is rotated about an axis located midway between axes 70 and 74.

On the axis 70 and fixed to the arms 65 and 66 are a pair of drive sprockets 76. Mounted on the axis 74 and rotatable with each of the arms 68 and 69 are a set of drive sprockets 78. Mounted in spaced relation to the drive sprockets 76 and 78 is a pair of driven sprockets which are fixed one adjacent on each end of a shaft 79 to which is also affixed a drive sprocket 80 corresponding to the driven sprocket. The drive sprocket 80 has a chain 81 therearound which is driven from a suitable motor or other driven sprocket (not shown) to rotate the sprocket 80 and to transfer a driving force to the driven sprocket around each of which is trained a chain 82 which in turn drives the sprockets 76 and 78 to rotate the frame 30 in a path about the sprockets and counterclockwise, as illustrated in FIG. 1.

Rotation of the frame 30 by the rotation of the arms 65 and 69, 66 and 68, effects a rotation of the tape support member 35 about its axis 47 to advance an additional length of tape from one side of the support member to the position for transfer to the web. This drive means for the tape support 35 is afforded by rotation of the frame 30. Rotation of the frame 30 causes a drive sprocket 85 fixed to the stub shaft 62 to rotate as the frame 30 is driven by the arm 68 about its arc. Rotation of the sprocket 85, through chain 86, and a second sprocket wheel 88, causes a shaft 90 to be rotated. Rotation of the shaft 90 rotates a worm gear 91 fixed thereto. The worm gear 91 has threaded portions 92 which engage sequentially lugs 94 on a wheel 95 fixed to the support shaft 48 for the tape support member 35. Thus, one rotation of the frame 30 causes the rotation of the shaft 90 sufficiently to rotate the tape support member 35 through an arc of 90 degrees to place a new length of tape 100 upon the upper surface of the tape support member 35 as the tape support member moves from the position shown in FIG. 5 to the position shown in FIG. 1.

Thus, in operation the drive means 81 applies a driving force to the drive chains 82 which afford rotation of the two pair of parallel arms fixedly mounted to drive sprockets 76 and 78 and which are connected to a rotatable tape support 35 to move the same along an arcuate path to advance predetermined lengths of tape into contact with a moving web 20. Rotation of the tape support in its arcuate path and about the axis thereof perpendicular to the polygonal sides advances the tape from the supply.

The drive for the tape support is designed to advance the tape support at a tangential speed through its arcuate path which will match the linear speed of the web to transfer the length of tape from the tape support to the moving web without deleteriously effecting the tape. The transfer is made under a slight compressive force such that the transfer is made as a result of the adhesive contacting the web and lifting the tape from the ports 40 on the tape support member 35 on which the length of tape was held by a vacuum force.

Having thus described the present invention with reference to the preferred embodiment it is to be understood that the rotational support means for carrying the tape support 35 in its arcuate path may comprise a linkage other than a parallelogram linkage with four arms as long as the tape head movement is in a generally transitional path to carry the sides of the member successively into engagement with the moving web.

What is claimed is:

1. A tape applicator for use in applying a length of tape to a continuously moving receptor web transversely to the direction of movement of the web, said applicator comprising means for supporting a supply roll of tape, means for advancing a length of tape from the supply roll and advancing a said length of tape in said direction of movement of said web, means for advancing lengths of tape in a second direction transverse to said direction of movement of the web, said means for advancing lengths of tape in a second direction comprising a polygonal tape support member rotated about an axis perpendicular to the sides thereof, said sides being formed with means for holding a length of tape on said sides, and means for carrying said lengths of tape successively along an arcuate path into contact with a said web to apply said lengths of tape to said web with said lengths of tape generally parallel and spaced along the length of a said web, said means for carrying said lengths of tape into contact with a web comprising linkage means supporting a frame on which said polygonal tape support is rotatably mounted for rotating said frame about an axis with said frame maintaining generally translational movement.

2. A tape applicator for use in applying a length of tape to a continuously moving receptor web transversely to the direction of movement of the web, said applicator comprising a frame, means for supporting a supply roll of tape on said frame, means for advancing a length of tape from the supply roll and advancing a said length of tape in said direction of movement of said web, a polygonal tape support member mounted on said frame for rotation on an axis parallel to the direction of movement of the web, means for placing a said length of tape on an edge of said support member, and means for carrying said support member and a said length of tape along an arcuate path into contact with a said web to apply said length of tape to a said web with said length of tape transverse to said web.

3. A tape applicator according to claim 2 wherein means are provided for rotating said support member on said axis in response to said means for carrying said support member applying a said length of tape to a said web whereby a second length of tape is positioned on said support member transverse to the direction of movement of a said web.

4. A tape applicator according to claim 3 wherein said means for placing lengths of tape on said support member includes vacuum means for holding a length of tape on said edges of said support member.

5. A tape applicator according to claim 2 wherein said means for carrying said support member along an arcuate path comprises a pair of parallel arms for moving said support member about a circular path the axis of which is transverse to the direction of movement of a said web.

* * * * *